Dec. 11, 1962  G. HAJIAN  3,068,418
AMPLITUDE LIMITER EMPLOYING INTEGRATING, CLIPPING
AND DIFFERENTIATING CIRCUITS IN SERIES
Filed Dec. 30, 1958
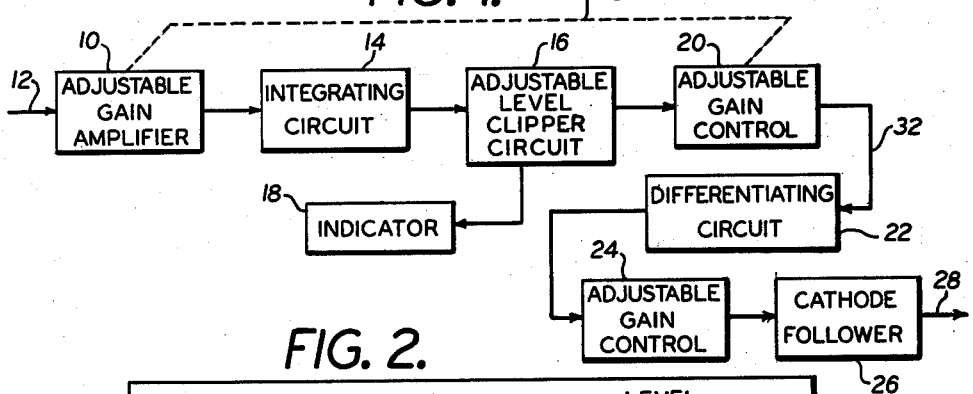
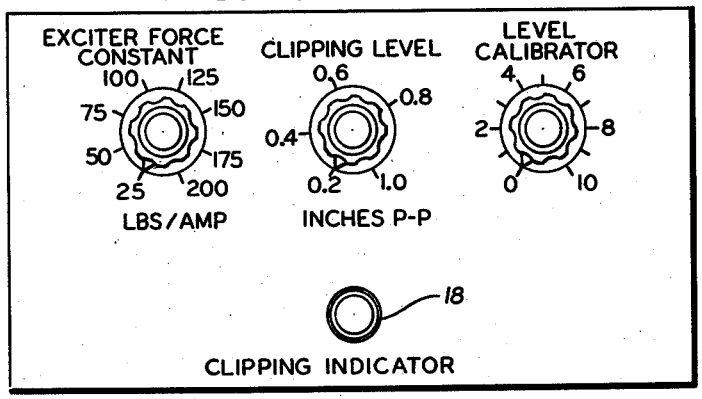
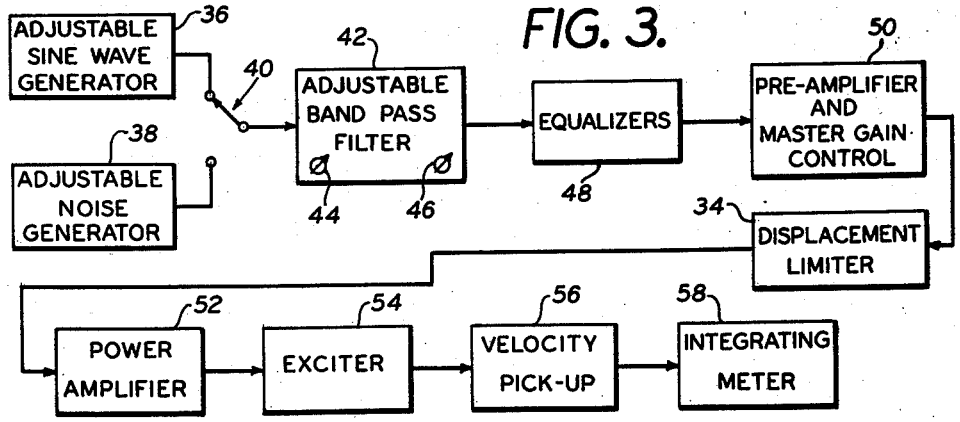
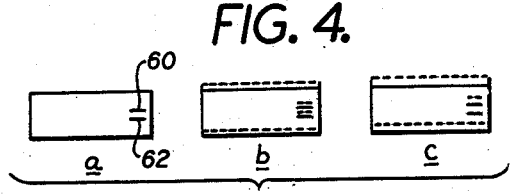
INVENTOR
GABRIEL HAJIAN
BY
Byerly, Townsend, Watson & Churchill
ATTORNEYS.

United States Patent Office 3,068,418
Patented Dec. 11, 1962

3,068,418
AMPLITUDE LIMITER EMPLOYING INTEGRATING, CLIPPING AND DIFFERENTIATING CIRCUITS IN SERIES
Gabriel Hajian, East Haven, Conn., assignor, by mesne assignments, to Textron Electronics, Inc.
Filed Dec. 30, 1958, Ser. No. 783,914
8 Claims. (Cl. 328—169)

The present invention relates to vibration exciter systems and more particularly to apparatus for preventing damage to the exciter caused by excessive or faulty excitation.

A basic system for vibration testing usually includes an electrodynamic vibration exciter, a power amplifier for supplying exciting voltage to the driving coil of the exciter, and a source of test signals which are fed to the power amplifier. With a given exciting voltage, larger displacements appear at the armature of the exciter at lower frequencies. Particularly in the range of frequencies from 10 to 1000 radians per second there is ever present the danger of causing the armature or moving element of the exciter to exceed its displacement limit and engage the mechanical stops with sufficient force to either damage the exciter or the equipment under test or both.

Various methods have been used heretofore for restricting the test signal or otherwise protecting the exciter; but all of these methods have a tendency to restrict the useful operating range of the system. It is the purpose of the present invention to provide a displacement limiter which eliminates at the input of the power amplifier only those signals which would cause excessive displacement of the exciter armature.

If the power amplifier which feeds the driving coil of the exciter has a reasonably flat frequency response at least over the range of 10 to 1000 radians per second, it will be found that the velocity of movement of the exciter armature is substantially proportional to the signal voltage at the input of the power amplifier. If this signal voltage is integrated over the aforementioned range of frequencies, a signal can be obtained which is proportionally related to the displacement of the exciter armature. Clipping or limiting this resultant signal and then differentiating same will provide a signal for energizing the exciter driving coil which is free from those signal voltages which would cause excessive displacement.

Therefore, in accordance with the present invention, there is provided a displacement limiter for inclusion in a vibration exciter system at a point in the system where the signal voltage for a given range of frequencies is proportionally related to the velocity of movement of the exciter armature, comprising an integrating circuit for integrating the signal voltage over the range of frequencies, a clipper circuit having an adjustable clipping level for clipping the output of the integrating circuit at a preselectable level, and a differentiating circuit for differentiating the output of the clipper circuit over the range of frequencies. As will appear from the detailed description to follow, the displacement limiter according to the present invention affords a soft limiting action whenever a pulse which would cause a high displacement appears in the test signal. This softness is necessary to avoid high acceleration peaks.

The invention will be better understood after reading the following detailed description of a preferred embodiment thereof with reference to the accompanying drawings in which:

FIG. 1 is a block diagram of a displacement limiter embodying the present invention;

FIG. 2 is a representation of a typical front panel for the displacement limiter of FIG. 1 showing the several manual adjustments and typical calibrations therefor;

FIG. 3 is a block diagram of a complete vibration exciter system including the displacement limiter of FIGS. 1 and 2; and FIG. 4 shows diagrammatically a method of determining the actual displacement of the table associated with an exciter armature.

Referring now to FIG. 1 of the drawing, the basic elements of a displacement limiter in accordance with the present invention are shown. An input signal, with respect to which the velocity of movement of the exciter armature is proportionally related for a given range of frequencies, is introduced to an adjutsable gain amplifier 10 at its input 12. The output of the amplifier is fed to an integrating circuit 14 and thence to the adjustable level clipper 16. As shown in the drawing, the indicator 18 is provided for furnishing an indication whenever clipping is taking place. The output of the adjustable level clipper is fed through an adjustable gain control 20 to a differentiating circuit 22. The output of the differentiating circuit is then supplied through an adjustable gain control 24 and a cathode follower 26 to the output 28 of the limiter.

Because of the inherent wide flat frequency response and low distortion level it is preferred to use operational amplifiers for both the integrating circuit 14 and the differentiating circuit 22 with appropriate feedback elements arranged in known manner. An operational amplifier may also be used as the adjustable gain amplifier 10 with its gain being controlled by an adjustable potentiometer connected in the feedback path. It is believed that the operational amplifier, as such, is so well known today that detailed description is unnecessary.

As shown in FIG. 1 the adjustable gain amplifier 10 is mechanically ganged by the connection 30 to the adjustable gain control 20. The latter may be merely a potentiometer arranged to variably attenuate the signals fed to it. The inter-connection is such that as the gain of the amplifier 10 is adjusted in one direction the gain of the control 20 is adjusted in the opposite direction. In other words, the components are reciprocally ganged. By suitably proportioning the components it can be arranged that the total gain between the input 12 and the output 32 of the control 20 remains constant over the entire range of adjustment. However, it should be apparent that the amplification of the signal applied to the input of the clipper 16 will be dependent upon the setting of the amplifier 10.

The adjustable level clipper 16 and indicator 18 may take any form known to those skilled in the art although it is preferred to employ biased diode clipping. An arrangement particularly well suited for this purpose is described and claimed in the co-pending application of Charles E. Maki, Serial No. 783,915 filed December 30, 1958 and assigned to the same assignee as the present application.

The adjustable gain control 24 may consist of a simple variable resistor or potentiometer while the cathode follower 26 is included for providing a low impedance output in known manner.

Referring now to FIG. 2 it will be seen that the control panel of the displacement limiter contains, in addition to the indicator 18 (which is here shown as a signal lamp), three manual adjustments labelled respectively, "Exciter Force Constant," "Clipping Level" and "Level Calibrator." The dial associated with the Exciter Force Constant control is calibrated in terms of pounds per ampere and refers to an operating characteristic of the exciter. Depending upon the size and construction of the exciter it will have a particular force constant which will vary from exciter to exciter. The Exciter Force Constant control manipulates the ganged connection 30 in FIG. 1 to establish the setting of the amplifier 10 and the gain control 20.

The next adjustment on the panel of FIG. 2 is that designated "Clipping Level" and, as shown, is provided with settings calibrated in units of actual displacement, e.g., inches peak-to-peak (P–P). It will be understood that this adjustment sets the clipping level of the clipper 16 of FIG. 1. The adjustable gain control 24 of FIG. 1 is regulated by the "Level Calibrator" control seen in FIG. 2.

The operation of the displacement limiter can be explained best in conjunction with the set-up procedure used for putting it into operation. For this purpose, reference should now be had to FIG. 3. As shown therein, the displacement limiter represented by the box 34 is connected to the basic components of a complete exciter system. These may consist of an adjustable sine wave generator 36 and an adjustable noise generator 38 which are selectively connected by a switch 40 to the input of an adjustable band-pass filter 42 having one adjustment 44 for the low frequency end of the band and a second adjustment 46 for the high frequency end of the band. In a typical system the output of the band-pass filter is supplied to the equalizers 48 which compensate for the frequency response characteristics of both the exciter and test specimen in order that the acceleration developed at the exciter table is proportional to the signal voltage appearing at the input of the equalizers. Although there are various arrangements for equalizing vibration exciter systems it is preferred to employ an Exciter Equalizer as described and claimed in the co-pending application of Theron Usher, Jr., Serial No. 720,234, filed March 10, 1958 and Peak-Notch Equalizers as described and claimed in the co-pending application of Theron Usher, Jr., Serial No. 720,235, filed March 10, 1958, both assigned to the same assignee as the present application.

The output from the equalizers may then be fed through a pre-amplifier and master gain control 50 to the displacement limiter 34. As previously mentioned the output of the displacement limiter is supplied directly to the power amplifier 52 which, in turn, feeds the exciter 54. In order to measure the displacement of the table of the exciter it can be connected mechanically with a transducer in the form of a velocity pick-up 56 whose output is supplied to an integrating meter 58 having a dial calibrated in units of actual displacement.

In lieu of use of the velocity pick-up 56 and integrating meter 58 it is possible to observe the displacement of the exciter table when the same is visibly exposed by placing a couple of reference marks thereon as shown in FIG. 4. Thus at *a* in FIG. 4 the table is shown quiescent with two marks 60 and 62 placed thereon a predetermined distance apart. The particular distance between the marks is selected equal to the desired displacement of the table. If the actual displacement of the table is less than that which is desired, the eye will appear to see four horizontal lines as shown over *b* in FIG. 4. However, when the desired displacement is reached, a coincidence or overlap will develop such that there now appears to be three rather than four lines. This is shown at *c* in FIG. 4.

At the time the various components of the system are being pre-adjusted for operation, the Exciter Force Constant control of the displacement limiter will be set to a value corresponding to that associated with the particular exciter employed in the system. This setting is an approximate one, and the value of the force constant can be found by dividing the root mean square (R.M.S.) force rating of the exciter by the R.M.S. current rating thereof. Next, with the Level Calibrator at zero such that the output of the limiter is zero, the various components of FIG. 3 are energized. The Clipping Level adjustment is now set to the value at which limiting is required. Next, with switch 40 in the position shown a low frequency sinusoidal signal, for example 20 cycles per second, is fed through the filter, equalizers, and pre-amplifier to the displacement limiter 34. By varying the master gain control 50 or any other gain control in the system preceding the displacement limiter, the magnitude of this signal is gradually increased until the indicator 18 just commences to signal that clipping is taking place. It should be understood that the band-pass filter 42 must be adjusted so as not to attenuate the low frequency signal. Now the level calibrator adjustment is manipulated from zero to regulate the gain control 24 and supply excitation through the power amplifier 52 to the exciter 54. The setting of the Level Calibrator is increased until the table displacement reaches the desired limiting value which should agree with the value set on the Clipping Level control. Either the integrating meter 58 with the velocity pick-up 56 or the method of FIG. 4 may be used to determine when the table displacement reaches the desired magnitude. As long as the system gain remains constant from the output of the displacement limiter to the input of the exciter no further adjustment need be made of either the Exciter Force Constant or the Level Calibrator, unless, of course, the exciter is changed.

Because of the soft clipping action inherent in the present arrangement, the actual displacement of the exciter table may exceed slightly the value set by the Clipping Level adjustment. However, this can be taken into consideration when pre-setting the clipping level.

Having described the invention with reference to a specific embodiment thereof, it will be understood that various changes may be made without departing from the true spirit of the invention as defined in the appended claims.

What is claimed is:

1. A displacement limiter, for inclusion in a vibration exciter system in series with the exciting signal at a point in the system where the signal voltage for a given range of frequencies is proportionally related to the velocity of movement of the exciter armature, comprising an integrating circuit for integrating said signal voltage over said range of frequencies, a clipper circuit coupled thereto and having an adjustable clipping level for clipping the output of said integrating circuit at a pre-selectable level, and a differentiating circuit coupled thereto for differentiating the output of said clipper circuit over said range of frequencies, an output of the differentiating circuit being coupled to an output for the limiter.

2. A displacement limiter according to claim 1, further comprising a pair of reciprocally ganged adjustable gain controlling devices, one device being included before and the other after said clipper circuit whereby the overall gain of the limiter is maintained constant while the calibration of the clipper circuit is varied.

3. A displacement limiter, for inclusion in a vibration exciter system in series with the exciting signal at a point in the system where the signal voltage for a given range of frequencies is proportionaly related to the velocity of movement of the exciter armature and the gain of the system between such point and the input of the exciter remains constant during a test run, comprising an integrating circuit for integrating said signal voltage over said range of frequencies, a clipper circuit coupled thereto and having an adjustable clipping level for clipping the output of said integrating circuit, manual adjustment means with settings calibrated in units of actual displacement coupled with said clipper circuit for adjusting said clipping level, and a differentiating circuit coupled thereto for differentiating the output of said clipper circuit over said range of frequencies, an output of the differentiating circuit being coupled to an output for the limiter.

4. A displacement limiter according to claim 3, further comprising a pair of reciprocally ganged adjustable gain controlling devices, one device being included before and the other after said clipper circuit whereby the overall gain of the limiter is maintained constant while the calibration of the clipper circuit is varied.

5. A displacement limiter, for inclusion in a vibration exciter system in series with the exciting signal at a point in the system where the signal voltage for a given range of frequencies is proportionally related to the velocity of movement of the exciter armature and the gain of the system between such point and the input of the exciter remains constant during a test run, comprising an integrating circuit for integrating said signal voltage over said range of frequencies, a clipper circuit coupled thereto and having an adjustable clipping level for clipping the output of said integrating circuit, manual adjustment means with settings calibrated in units of actual displacement coupled with said clipper circuit for adjusting said clipping level, an indicator coupled with said clipper circuit for indicating when clipping is taking place, a differentiating circuit coupled thereto for differentiating the output of said clipper circuit over said range of frequencies, and an adjustable gain control coupled to the output of said differentiating circuit for adjusting the system gain between the clipper circuit and the exciter thereby to provide accurate calibration of the calibrated settings of said manual adjustment means, an output of the adjustable gain control being coupled to an output for the limiter.

6. A displacement limiter according to claim 5, further comprising a pair of reciprocally ganged adjustable gain controlling devices, one device being included before said clipper circuit and the other device being included between said clipper circuit and said adjustable gain control, said pair of devices having settings calibrated in accordance with a characteristic of the vibration exciter for adjusting the calibration of the clipper circuit to suit a given exciter while maintaining the overall gain constant between the input and output of said one and said other device respectively.

7. A displacement limiter, for inclusion in a vibration exciter system in series with the exciting sgnal at a point in the system where the signal voltage for a range of frequencies from 10 to 1000 radians per second is proportionally related to the velocity of movement of the exciter armature and the gain of the system between such point and the input of the exciter remains constant during a test run, comprising an integrating circuit for integrating said signal voltage over said range of frequencies, a clipper circuit coupled thereto and having an adjustable clipping level for clipping the output of said integrating circuit, manual adjustment means with settings calibrated in units of actual displacement coupled with said clipper circuit for adjusting said clipping level, and a differentiating circuit coupled thereto for differentiating the output of said clipper circuit over said range of frequencies, an output of the differentiating circuit being coupled to an output for the limiter.

8. A displacement limiter, for inclusion in a vibration exciter system in series with the exciting signal at a point in the system where the signal voltage for a range of frequencies from 10 to 1000 radians per second is proportionally related to the velocity of movement of the exciter armature and the gain of the system between such point and the input of the exciter remains constant during a test run, comprising an input, an output, an adjustable gain amplifier coupled to receive said signal voltage from said input, an integrating circuit coupled to said amplifier for integrating the amplified signal voltage over said range of frequencies, a clipper circuit coupled thereto and having an adjustable clipping level for clipping the output of said integrating circuit, manual adjustment means with settings calibrated in units of actual displacement coupled with said clipper circuit for adjusting said clipping level, an indicator coupled with said clipper circuit for indicating when clipping is taking place, a first adjustable gain control coupled thereto for adjustably attenuating the output of said clipper circuit, said first gain control being mechanically ganged with said adjustable gain amplifier for simultaneous adjustment such that the overall gain is constant from said input to the output of said first gain control, a differentiating circuit coupled thereto for differentiating the output of sad first gain control over said range of frequencies, and a second adjustable gain control coupling the output of said differentiating circuit to said output of the limiter and adjustable independently of the first gain control for adjusting the system gain between the clipper circuit and the exciter thereby to provide accurate calibration of the calibrated settings of said manual adjustment means.

References Cited in the file of this patent
UNITED STATES PATENTS

| | | |
|---|---|---|
| 2,506,770 | Braden | May 9, 1950 |
| 2,566,832 | Grandmann | Sept. 4, 1951 |
| 2,629,775 | Goldstine | Feb. 24, 1953 |
| 2,791,751 | Fine et al. | May 7, 1957 |
| 2,898,457 | Auerbach | Aug. 4, 1959 |